US009552646B2

(12) United States Patent
Tanaka et al.

(10) Patent No.: US 9,552,646 B2
(45) Date of Patent: Jan. 24, 2017

(54) IMAGE PROCESSING DEVICE, IMAGE PROCESSING METHOD, AND IMAGE PROCESSING PROGRAM, FOR DETECTING AN IMAGE FROM A VISIBLE LIGHT IMAGE AND A TEMPERATURE DISTRIBUTION IMAGE

(71) Applicant: OMRON Corporation, Kyoto-shi, Kyoto (JP)

(72) Inventors: Bunzo Tanaka, Shiga (JP); Koji Togo, Shiga (JP); Masamichi Kogure, Shiga (JP); Masataka Serikawa, Osaka (JP)

(73) Assignee: OMRON Corporation, Kyoto (JP)

( * ) Notice: Subject to any disclaimer, the term of this patent is extended or adjusted under 35 U.S.C. 154(b) by 179 days.

(21) Appl. No.: 14/168,060

(22) Filed: Jan. 30, 2014

(65) Prior Publication Data
US 2014/0233796 A1    Aug. 21, 2014

(30) Foreign Application Priority Data
Feb. 15, 2013 (JP) ................................. 2013-027476

(51) Int. Cl.
*G06K 9/00* (2006.01)
*G06T 7/20* (2006.01)

(52) U.S. Cl.
CPC ......... *G06T 7/2033* (2013.01); *G06K 9/00362* (2013.01); *G06T 7/204* (2013.01);
(Continued)

(58) Field of Classification Search
CPC ............ G06T 2207/20144; G06T 2207/10048; G06T 7/0079; G06T 7/20; G06K 9/00362
See application file for complete search history.

(56) References Cited

U.S. PATENT DOCUMENTS 4,922,915 A * 5/1990 Arnold et al. ................ 382/128
5,589,901 A * 12/1996 Means ............................ 396/12
(Continued)

FOREIGN PATENT DOCUMENTS

JP    H01-286571 A    11/1989
JP    H09-265585 A    10/1997
(Continued)

OTHER PUBLICATIONS

Notification of Reasons for Refusal issued in corresponding Japanese Application No. 2013-027476, mailed on Jan. 26, 2016 (6 pages).

*Primary Examiner* — Utpal Shah
(74) *Attorney, Agent, or Firm* — Osha Liang LLP

(57) ABSTRACT

An image processing device has a first image input unit that inputs a visible light image of a target area imaged by a first camera, a second image input unit that inputs a temperature distribution image of the target area imaged by a second camera, a first image processing section that processes the visible light image input to the first image input unit, and detects an object imaged in the visible light image, a second image processing section that processes the temperature distribution image input to the second image input unit and detects an object imaged in the temperature distribution image, and an image region extracting unit that extracts an image region not suited for the detection of the object in the first image processing section for the visible light image of the target area input to the first image input unit.

12 Claims, 3 Drawing Sheets

(52) U.S. Cl.
 CPC ........... *G06T 2207/10016* (2013.01); *G06T 2207/10048* (2013.01); *G06T 2207/20021* (2013.01); *G06T 2207/20144* (2013.01); *G06T 2207/30201* (2013.01)

(56) References Cited

U.S. PATENT DOCUMENTS

| | | | | |
|---|---|---|---|---|
| 5,881,171 | A | * | 3/1999 | Kinjo ........................ 382/199 |
| 6,792,203 | B1 | * | 9/2004 | Ide et al. ..................... 396/65 |
| 2002/0176010 | A1 | * | 11/2002 | Wallach et al. ............ 348/229.1 |
| 2003/0021478 | A1 | * | 1/2003 | Yoshida ...................... 382/195 |
| 2004/0125992 | A1 | * | 7/2004 | Aoki ................... G06K 9/00228 382/118 |
| 2008/0037838 | A1 | * | 2/2008 | Ianculescu et al. .......... 382/118 |
| 2008/0159591 | A1 | * | 7/2008 | Ruedin ........................ 382/103 |
| 2009/0016636 | A1 | * | 1/2009 | Kasashima et al. .......... 382/274 |
| 2009/0245638 | A1 | * | 10/2009 | Collier et al. ................ 382/173 |
| 2009/0303342 | A1 | * | 12/2009 | Corcoran et al. .......... 348/222.1 |
| 2010/0182433 | A1 | * | 7/2010 | Shimbo et al. .............. 348/153 |
| 2011/0298932 | A1 | * | 12/2011 | Gorian et al. ............... 348/164 |
| 2012/0327218 | A1 | * | 12/2012 | Baker et al. ................. 348/135 |

FOREIGN PATENT DOCUMENTS

| | | | | |
|---|---|---|---|---|
| JP | 2002-260167 | A | | 9/2002 |
| JP | 2002260167 | A | * | 9/2002 |
| JP | 2004257924 | A | * | 9/2004 |
| JP | 2006-101384 | A | | 4/2006 |
| JP | 2006099603 | A | * | 4/2006 |
| JP | 2008-098858 | A | | 4/2008 |
| JP | 2008098858 | A | * | 4/2008 |
| JP | 2010068452 | A | * | 3/2010 |

* cited by examiner

IMAGE PROCESSING DEVICE, IMAGE PROCESSING METHOD, AND IMAGE PROCESSING PROGRAM, FOR DETECTING AN IMAGE FROM A VISIBLE LIGHT IMAGE AND A TEMPERATURE DISTRIBUTION IMAGE

BACKGROUND OF THE INVENTION

1. Technical Field

The present invention relates to a technique of processing an imaged image of a target area, and detecting an imaged object.

2. Related Art

Conventionally, there has been proposed an image processing device configured to process a visible light image of a target area imaged by a visible light camera, and perform detection of an imaged object such as a person, vehicle, or the like and tracking of the detected object (see Japanese Unexamined Patent Publication No. 9-265585). In Japanese Unexamined Patent Publication No. 9-265585, a differential image (background differential image) of the visible light image of the target area imaged by the visible light camera and a background image of the target area, a differential image (inter-frame differential image) of two temporally successive imaged images (visible light images), and the like are generated to perform detection and tracking of the imaged object.

Furthermore, there has also been proposed an image processing device configured to process a temperature distribution image of a target area imaged by a far-infrared camera, and perform detection of an imaged object such as a person, vehicle, or the like and tracking of the detected object (see Japanese Unexamined Patent Publication No. 2006-101384). Japanese Unexamined Patent Publication No. 2006-101384 has a configuration of generating a binary image distinguished with a pixel within a range of an upper limit threshold value and a lower limit threshold value of a luminance value (pixel value) corresponding to the temperature of a human, and a pixel not within such range for each pixel of a thermal image imaged by the far-infrared camera, and detecting the imaged human. Similar to the visible light image, the detection and tracking of the imaged object are carried out by generating the background differential image and the inter-frame differential image even with respect to the temperature distribution image of the target area imaged by the far infrared camera.

SUMMARY

Comparing an image processing system by the visible light image and an image processing system by the temperature distribution image, the visible light image is useful compared to the image processing by the temperature distribution image in that attributes such as sex and age of the person can be estimated by processing the face of the imaged person (detected person), and person authentication by matching with the face of a registrant registered in a database, and the like can be performed. The imaged visible light image may be displayed on a display unit to allow the attendant, and the like to check the face.

The visible light image, however, is easily subjected to the influence of illumination intensity change of the target area. In an image region of the visible light image where a pixel of overexposure caused by excessively large light amount and a pixel of underexposure caused by lack of light amount are concentrated to a certain extent, the object may not be appropriately detected. In other words, the object tends to be easily missed in the image region of the visible light image where the pixels of overexposure and underexposure are concentrated to a certain extent. If the object is missed, the object that entered the target area cannot be detected, and furthermore, the tracking object may get lost thus resulting in failure in the tracking of the object.

One or more embodiments of the present invention provides a technique of enhancing the reliability of the process of processing the visible light image and performing detection, tracking, and the like of the object that entered the target area by suppressing the occurrence of events of missing the object that entered the target area and losing the tracking object.

An image processing device according to one or more embodiments of the present invention is configured as follows.

A visible light image of a target area imaged by a first camera is input to a first image input unit. A temperature distribution image of the target area imaged by a second camera is input to a second image input unit. The first camera is a video camera configured to image the visible light image, and the second camera is a far infrared camera configured to image the temperature distribution image.

A first image processing section processes the visible light image input to the first image input unit, and detects an object imaged in the visible light image. The first image processing section detects the object imaged in the visible light image through a background differential method and an inter-frame differential method, for example.

A second image processing section processes the temperature distribution image input to the second image input unit, and detects an object imaged in the temperature distribution image. The second image processing section also detects the object imaged in the temperature distribution image through the background differential method and the inter-frame differential method, for example, similarly to the first image processing section.

An image region extracting unit extracts an image region not suited for the detection of the object in the first image processing section for the visible light image of the target area input to the first image input unit. The image region extracting unit is configured to extract an image region where the pixel of overexposure due to excessively large light amount and the pixel of underexposure due to lack of light amount are concentrated to a certain extent as the image region not suited for the detection of the object in the first image processing section.

The image region extracting unit may be configured to determine whether or not the image region not suited for the detection of the object in the first image processing section for every block obtained by dividing into plurals the visible light image of the target area input to the first image input unit. According to such configuration, whether or not the image region not suited for the detection of the object in the first image processing section is determined and extracted based on the total number of pixels outside the range of the pixel value defined in advance in the block for every block, which is obtained by dividing the visible light image into plurals. More specifically, the block in which the total number of pixels outside the range of the pixel value defined in advance is greater than the number of pixels defined in advance, or the block in which the ratio of the total number of pixels outside the range of the pixel value defined in advance in the block and the total number of pixels of the block is greater than a ratio defined in advance may be determined and extracted as the image region not suited for the detection of the object in the first image processing section.

The second image processing section processes the image region of the temperature distribution image input to the second image input unit corresponding to the image region of the visible light image not suited for the detection of the object in the first image processing section extracted by the image region extracting unit, and detects the imaged image. To suppress the processing load, according to one or more embodiments of the present invention, the second image processing section is configured to not perform the detection process of the object with respect to the image region of the temperature distribution image input to the second image input unit corresponding to the image region (in this region, the detection of the object by the first image processing section is carried out) of the visible light image not extracted by the image region extracting unit.

In the visible light image, the second image processing section processes the temperature distribution image and detects the object for the image region where the pixel of overexposure due to excessively large light amount and the pixel of underexposure due to lack of light amount are concentrated to a certain extent, so that the object can be suppressed from being missed. The reliability of the process of processing the visible light image and performing detection, tracking, and the like of the object that entered the target area can be enhanced.

An image processing method according to one or more embodiments of the present invention may performed by a computer executing a image processing program stored on a non-transitory computer-readable medium. According to one or more embodiments of the present invention, the reliability of the process of processing the visible light image and performing detection, tracking, and the like of the object that entered the target area can be enhanced.

DETAILED DESCRIPTION

Embodiments of the present invention will be hereinafter described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
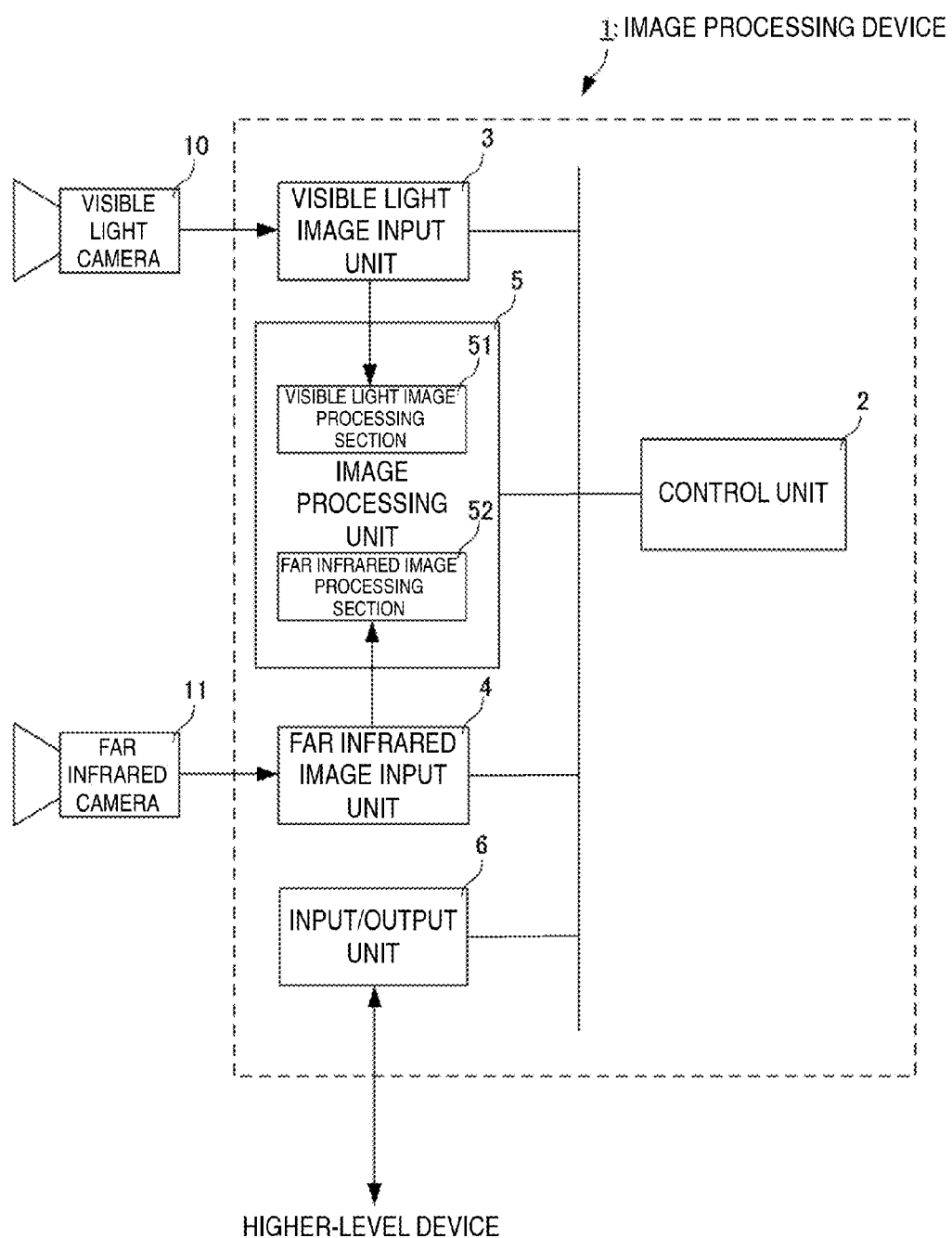
FIG. 1 is a view illustrating a configuration of main parts of an image processing device.

FIG. 1 is a view illustrating a configuration of the main parts of an image processing device according to one or more embodiments of the present invention.

The image processing device 1 includes a control unit 2, a visible light image input unit 3, a far infrared image input unit 4, an image processing unit 5, and an input/output unit 6.

The control unit 2 controls the operation of each unit in the main body of the image processing device 1.

A visible light camera 10 (serving as a first camera in one or more embodiments of the present invention) and a far infrared camera 11 (serving as a second camera in one or more embodiments of the present invention) are connected to the image processing device 1. The visible light camera 10 and the far infrared camera 11 image a target area to perform the detection of an object at substantially the same angle and at substantially the same imaging magnification. The visible light camera 10 and the far infrared camera 11 may be configured to be integrally arranged in the main body of the image processing device 1, or may be configured as separate housings from the main body of the image processing device 1.

A visible light image of the target area imaged by the visible light camera 10 is input to the visible light image input unit 3. A far infrared image (temperature distribution image) of the target area imaged by the far infrared camera 11 is input to the far infrared image input unit 4.

The image processing unit 5 includes a visible light image processing section 51 and a far infrared image processing section 52. The visible light image processing section 51 processes the visible light image input to the visible light image input unit 3 and performs the detection, and the like of the imaged object. The far infrared image processing section 52 processes the far infrared image input to the far infrared image input unit 4 and performs the detection, and the like of the imaged object.

The object detected by the visible light image processing section 51 and the far infrared image processing section 52 is defined in advance according to the application, and is, for example, person or vehicle. When detecting a person for the object, the visible light image processing section 51 cuts out the face of the detected person, and performs an attribute estimating process of estimating the attributes such as sex and age of the person, a face authentication process of authenticating whether or not the detected person is a registrant registered in advance, and the like. When detecting a vehicle for the object, the visible light image processing section 51 cuts out a number plate attached to the vehicle, and performs a character recognition process of recognizing a number plate number notated on the number plate, and the like.

The far infrared image processing section 52 does not perform the attribute estimating process, the face authentication process, the character recognition process, and the like since the image to process is the far infrared image. The image processing unit 5 also performs tracking, and the like of the detected object.

The input/output unit 6 outputs the processing result of the image processing unit 5 (visible light image processing section 51, and far infrared image processing section 52) to a higher-level device, and the like (not illustrated). The input/output unit 6 also receives input from the higher-level device and the like.

Figure 2A:
FIGS. 2A to 2C are views illustrating a target area, a visible light image, and a far infrared image.
Figure 2B:
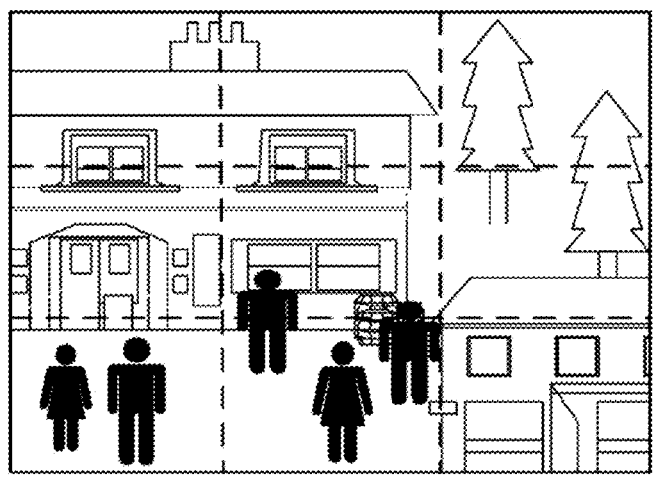
Figure 2C:
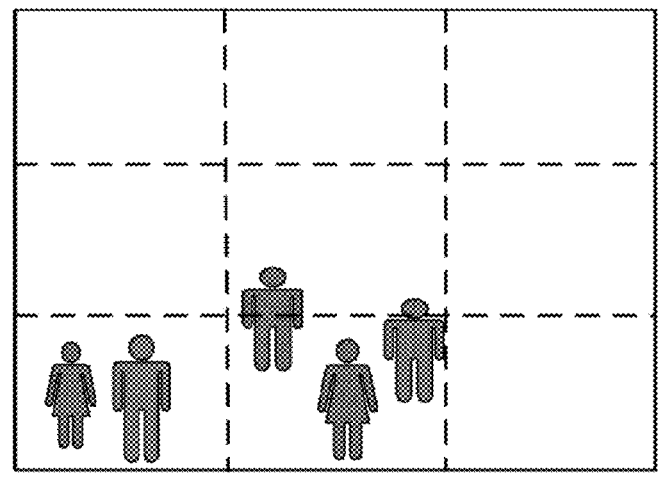

FIG. 2A illustrates a target area. FIG. 2B illustrates a visible light image of the target area imaged by the visible light camera. FIG. 2C illustrates a far infrared image of the target area imaged by the far infrared camera.

In FIG. 2C, the far infrared image (temperature distribution image) is shown with a binary image in which a person, which is the object, and the background such as a building, and the like, are merely distinguished, but actually, each pixel is a multiple-value image indicating a pixel value corresponding to the temperature.

As described above, the visible light camera 10 and the far infrared camera 11 image the target area at substantially the same angle and at substantially the same imaging magnification.

The visible light image processing section 51 stores a setting of dividing the visible light image input to the visible light image input unit 3 into a plurality of blocks. A broken line illustrated in FIG. 2B is a line that divides the visible light image into a plurality of blocks, and an example of dividing the visible light image into nine blocks of 3×3 is illustrated in this example. Similarly, the far infrared image processing section 52 stores a setting of dividing the far infrared image input to the far infrared image input unit 4 into a plurality of blocks. A broken line illustrated in FIG. 2C is a line that divides the far infrared image into a plurality of blocks, and an example of dividing the far infrared image into nine blocks of 3×3 is illustrated in this example.

The visible light image and the far infrared image are set to be divided to the same number of blocks. The image processing unit 5 stores the correspondence of the blocks imaging substantially the same region between both images. The dividing number of blocks is not limited to the nine blocks illustrated herein, and may be 12 blocks, 16 blocks, and the like. The size of each block may be uniform or may be different.

The visible light image processing section 51 generates the differential image (visible light background differential image) of the visible light image of the target area imaged by the visible light camera 10 and the background image (hereinafter referred to as visible light background image) of the target area to perform the process of detection, tracking, and the like of the imaged object and also perform the attribute estimating process, the face recognition process, the character recognition process, and the like described above, as needed. The visible light image processing section 51 also updates the visible light background image of the target area.

The far infrared image processing section 52 generates the differential image (far infrared background differential image) of the far infrared image of the target area imaged by the far infrared camera 11 and the background image (hereinafter referred to as far infrared background image) of the target area to perform detection and tracking of the imaged object. The far infrared image processing section 52 also updates the far infrared background image of the target area.

The image processing unit 5 may be configured by a processor of one chip, or the visible light image processing section 51 and the far infrared image processing section 52 may be configured with different processors.

In this example, an example of performing the detection process of the object in the image processing unit 5 through the background differential method is described, but may be through a method of performing with a known inter-frame differential method, or other methods.

The image processing unit 5 corresponds to a computer for executing the image processing method according to one or more embodiments of the present invention, and also corresponds to a computer caused to execute an image processing program according to one or more embodiments of the present invention.

The operation of the image processing device 1 according to one or more embodiments of the present invention will be hereinafter described.

The imaging timing is synchronized in the visible light camera 10 and the far infrared camera 11. The visible light camera 10 and the far infrared camera 11 input the imaged image of about ten frames in one second to the image processing device 1.

Each time the visible light image of the target area imaged by the visible light camera 10 is input to the visible light image input unit 3, the visible light image processing section 51 uses the input visible light image to update the visible light background image of the target area. The visible light image processing section 51 stores the visible light background image in a memory (not illustrated). Various methods have been proposed and are known for updating the visible light background image, and hence the description thereof will be omitted. The updating method of the visible light background image may be determined according to the imaging property of the visible light camera 10, the environment of the target area, and the like.

Each time the far infrared image of the target area imaged by the far infrared camera 11 is input to the far infrared image input unit 4, the far infrared image processing section 52 uses the input far infrared image to update the far infrared background image of the target area. The far infrared image processing section 52 stores the far infrared background image in a memory (not illustrated). Various methods have been proposed and are known for updating the far infrared background image, and hence the description thereof will be omitted. The updating method of the far infrared background image may be determined according to the imaging property of the far infrared camera 11, the environment of the target area, and the like.

Figure 3:
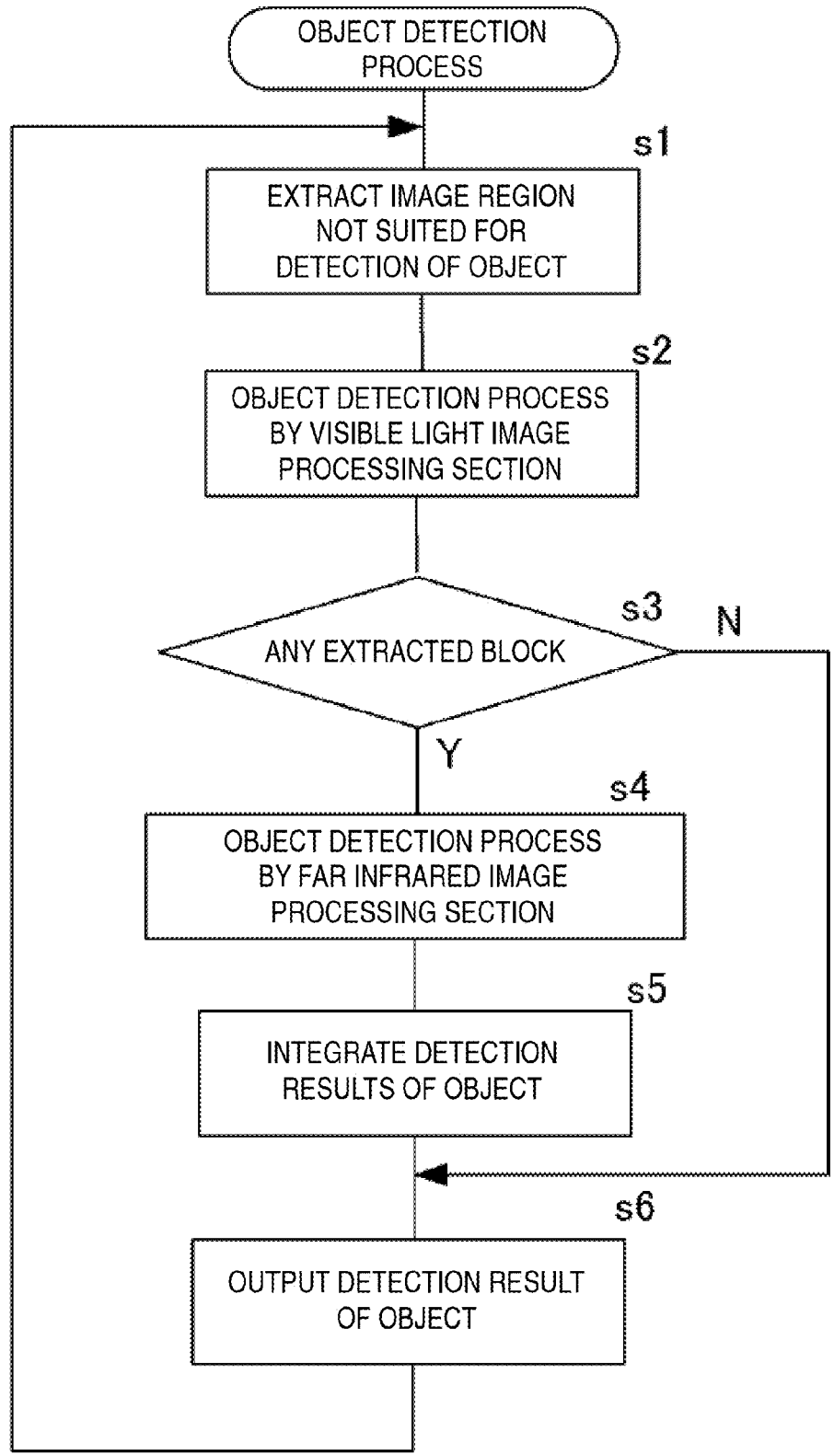
FIG. 3 is a flowchart illustrating an object detection process.

The object detection process in the image processing device 1 will now be described. FIG. 3 is a flowchart illustrating the object detection process.

In the image processing device 1, the visible light image processing section 51 performs a process of extracting an image region not suited for the detection of the object with respect to the visible light image input to the visible light image input unit 3 (s1). In s1, the visible light image processing section 51 determines whether or not the block is an image region not suited for the detection of the object and extracts the block determined not to be suited for the detection of the object for each block divided at the broken line illustrated in FIG. 2B.

The determination on whether or not the image region (block) not suited for the detection of the object is carried out in the following manner. First, the visible light image processing section 51 determines whether or not the pixel value (luminance value) of the pixel is within a range of the pixel values defined in advance, and counts the total number of pixels not within the relevant range for each pixel in the block to be processed. The range of the pixel values is a pixel value of the pixel in which the lower limit determines underexposure, and a pixel value of the pixel in which the upper limit determines overexposure.

The visible light image processing section 51 determines as the image region (block) not suited for the detection of the object if the total number of counted pixels (total number of pixels in which the pixel value is outside the range) is greater than a predefined number.

Furthermore, the determination may be a process of determining as the image region (block) not suited for the detection of the object if a ratio of the total number of counted pixels (total number of pixels in which the pixel value is outside the range) and the total number of pixels in the block to be processed is greater than a predefined value.

The visible light image processing section 51 performs the detection process of the object on the blocks other than the block determined and extracted as not suited for the detection of the object in s1 (s2). In other words, in s2, the visible light image processing section 51 performs the detection process of the object with respect to the image region (block) of the visible light image suited for the detection of the object. For example, if the block at the upper right corner illustrated in FIG. 2B is extracted as the block not suited for the detection of the object in s1, the detection process of the object is performed on the blocks other than the block at the upper right corner. Although the visible light image processing section 51 may perform the detection process of the object on all the blocks, according to one or more embodiments of present invention, the visible light image processing section 51 is configured to not perform the detection process of the object for the block extracted as not suited for the detection of the object in s1 for the purpose of reducing the processing load. In s2, the visible light background differential image is generated using the visible light background image stored at the relevant time point, and the imaged object is detected.

The image processing unit 5 determines the presence or absence of the block determined and extracted as not suited for the detection of the object in s1 by the visible light image processing section 51 (s3), and outputs the detection result of the object in s2 to the higher-level device (s6) if the block is not extracted in s1, and returns to s1.

If the block is extracted in s1, the image processing unit 5 performs the detection process of the object on the relevant block with the far infrared image processing section 52 (s4). For example, if the block at the upper right corner illustrated in FIG. 2B is extracted as the block not suited for the detection of the object in s1, the detection process of the object is performed on the block at the upper right corner illustrated in FIG. 2C.

In s4, the far infrared image processing section 52 uses the far infrared background image stored at this time point to generate the far infrared background differential image, and detects the imaged object. In other words, the far infrared image processing section 52 performs the detection process of the object on the block in which the visible light image processing section 51 cannot appropriately detect the object due to the concentration to a certain extent of the pixel of overexposure by excessively large light amount and the pixel of underexposure by lack of light amount.

Although the far infrared image processing section 52 may perform the detection process of the object on all the blocks, according to one or more embodiments of the present invention, the far infrared image processing section 52 is configured not to perform the detection process of the object for the block not extracted as not suited for the detection of the object in s1 for the purpose of reducing the processing load. The visible light image for performing the detection process of the object in s2 and the far infrared image for performing the detection process of the object in s4 are imaged images of the target area imaged at substantially the same timing.

The image processing unit 5 combines the detection result of the object of the visible light image processing section 51 in s2 and the detection result of the object of the far infrared image processing section 52 in s4 (s5), and outputs the same to the higher-level device as the detection result of the object of this time (s6). In s5, the combination of having the detection result of the object performed in s2 by the visible light image processing section 51 for the block not extracted in s1, and the detection result of the object performed in s4 by the far infrared image processing section 52 for the block extracted in s1 is carried out.

Thus, in the image processing device 1 according to the present example, the imaged object is detected using the far infrared image for the image region where the pixel of overexposure due to excessively large light amount and the pixel of underexposure due to lack of light amount are concentrated to a certain extent in the visible light image. Thus, the object imaged in the image region where the pixel of overexposure due to excessively large light amount and the pixel of underexposure due to lack of light amount are concentrated to a certain extent is suppressed from being missed. Therefore, the reliability of the processes for processing the visible light image and performing detection, tracking, and the like of the object that entered the target area can be enhanced.

The tracking of the object that entered the target area may be carried out by the image processing unit 5, but may be carried out by the higher-level device using the object detection result output in s6.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An image processing device comprising:
    a first image input unit that inputs a visible light image of a target area imaged by a first camera;
    a second image input unit that inputs a temperature distribution image of the target area imaged by a second camera;
    a first image processing section that processes the visible light image input to the first image input unit, and detects an object imaged in the visible light image;
    a second image processing section that processes the temperature distribution image input to the second image input unit and detects an object imaged in the temperature distribution image; and
    an image region extracting unit that extracts an image region not suited for a detection of the object in the first image processing section for the visible light image of the target area input to the first image input unit,
    wherein the second image processing section processes an image region of the temperature distribution image input to the second image input unit corresponding to the image region of the visible light image extracted as not suited for the detection of the object in the first image processing section by the image region extracting unit, and detects an imaged object, and
    wherein the image region extracting unit determines whether an image region not suited for the detection of the object in the first image processing section for every block obtained by dividing into plurals the visible light image of the target area input to the first image input unit.

2. The image processing device according to claim 1, wherein the image region extracting unit determines whether the image region not suited for the detection of the object in the first image processing section based on a total number of pixels outside a range of a pixel value defined in advance for every block obtained by dividing into plurals the visible light image of the target area input to the first image input unit.

3. The image processing device according to claim 2, wherein the image region extracting unit determines whether the image region not suited for the detection of the object in the first image processing section based on a ratio of a total number of pixels outside a range of a pixel value defined in advance and a total number of pixels of the block for every block obtained by dividing into plurals the visible light image of the target area input to the first image input unit.

4. The image processing device according to claim 1, wherein the second image processing section does not perform detection of the object with respect to the image region of the temperature distribution image input to the second image input unit corresponding to the image region of the visible light image for the image region not extracted as not suited for the detection of the object in the first image processing section by the image region extracting unit.

5. The image processing device according to claim 2, wherein the second image processing section does not perform detection of the object with respect to the image region of the temperature distribution image input to the second image input unit corresponding to the image region of the visible light image for the image region not extracted as not suited for the detection of the object in the first image processing section by the image region extracting unit.

6. The image processing device according to claim 3, wherein the second image processing section does not perform detection of the object with respect to the image region of the temperature distribution image input to the second image input unit corresponding to the image region of the visible light image for the image region not extracted as not suited for the detection of the object in the first image processing section by the image region extracting unit.

7. The image processing device according to claim 1, further comprising:
   an output unit that integrates and outputs the detection results of the object by the first image processing section and the second image processing section.

8. The image processing device according to claim 2, further comprising:
   an output unit that integrates and outputs the detection results of the object by the first image processing section and the second image processing section.

9. The image processing device according to claim 3, further comprising:
   an output unit that integrates and outputs the detection results of the object by the first image processing section and the second image processing section.

10. The image processing device according to claim 4, further comprising:
    an output unit that integrates and outputs the detection results of the object by the first image processing section and the second image processing section.

11. An image processing method, comprising:
    a first image processing step of processing a visible light image of a target area input to a first image input unit and detecting an object imaged in the visible light image;
    a second image processing step of processing a temperature distribution image input to a second image input unit and detecting an object imaged in the temperature distribution image; and
    an image region extracting step of extracting an image region not suited for a detection of the object in the first image processing step for the visible light image of the target area input to the first image input unit,
    wherein the second image processing step is a step of processing an image region of the temperature distribution image input to the second image input unit corresponding to the image region of the visible light image extracted as not suited for the detection of the object in the first image processing step in the image region extracting step, and detecting an imaged object, and
    wherein the image region extracting step comprises determining whether an image region not suited for the detection of the object in the first image processing step for every block obtained by dividing into plurals the visable light image of the target area input to the first image input unit.

12. An image processing program stored on a non-transitory computer readable medium that causes a computer to perform:
    a first image processing step of processing a visible light image of a target area input to a first image input unit and detecting an object imaged in the visible light image;
    a second image processing step of processing a temperature distribution image input to a second image input unit and detecting an object imaged in the temperature distribution image; and
    an image region extracting step of extracting an image region not suited for a detection of the object in the first image processing step for the visible light image of the target area input to the first image input unit,
    wherein the second image processing step is a step of processing an image region of the temperature distribution image input to the second image input unit corresponding to the image region of the visible light image extracted as not suited for the detection of the object in the first image processing step in the image region extracting step, and detecting an imaged object and
    wherein the image region extracting step comprises determining whether an image region not suited for the detection of the object in the first image processing step for every block obtained by diving into plurals the visable light image of the target area input to the first image input unit.

\* \* \* \* \*